(12) United States Patent
Chen

(10) Patent No.: US 8,253,871 B2
(45) Date of Patent: Aug. 28, 2012

(54) VERTICAL ALIGNMENT LIQUID CRYSTAL DISPLAY DEVICE

(75) Inventor: Hung-Yu Chen, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 224 days.

(21) Appl. No.: 12/873,262

(22) Filed: Aug. 31, 2010

(65) Prior Publication Data

US 2011/0069244 A1    Mar. 24, 2011

(51) Int. Cl.
*G02F 1/133* (2006.01)

(52) U.S. Cl. .......... 349/33; 349/123; 349/128; 349/139; 349/155

(58) Field of Classification Search ............. 349/56, 349/33, 34, 123, 128, 132, 134, 139, 155, 349/157, 143, 129, 127
See application file for complete search history.

(56) References Cited

U.S. PATENT DOCUMENTS

| 6,323,926 | B2 | 11/2001 | Watanabe et al. | |
| 6,522,379 | B1 * | 2/2003 | Ishihara et al. | 349/139 |
| 2001/0020993 | A1 * | 9/2001 | Watanabe et al. | 349/130 |
| 2004/0105062 | A1 * | 6/2004 | Lai et al. | 349/129 |
| 2011/0069244 | A1 * | 3/2011 | Chen | 349/33 |

\* cited by examiner

*Primary Examiner* — Brian Healy
(74) *Attorney, Agent, or Firm* — Muncy, Geissler, Olds & Lowe, PLLC

(57) ABSTRACT

A vertical alignment liquid crystal display device includes a number of pixel regions. Each pixel region includes a lower substrate unit and an upper substrate unit having an upper glass layer, a first protrusion and a second protrusion formed on the upper glass layer, and a conductive layer formed on the second protrusion. Each of the first and second protrusions includes two uneven sections. A first potential difference is applied between the upper glass layer and the lower substrate unit, and a second potential difference, being independent from the first potential difference, is applied between the conductive layer formed on the second protrusion and the lower substrate unit.

20 Claims, 8 Drawing Sheets

VERTICAL ALIGNMENT LIQUID CRYSTAL DISPLAY DEVICE

BACKGROUND

1. Technical Field

The present disclosure relates to a vertical alignment liquid crystal display (LCD) device, and particularly to a multi-domain vertical alignment (MVA) LCD device.

2. Description of the Related Art

Wide-viewing angle LCD devices were developed to improve the viewing angle of a multi-domain vertical alignment LCD device. Referring to FIGS. 7 and 8, a four-domain pixel region 10 used in LCD devices is shown. The four-domain pixel region 10 includes a lower substrate unit 11 and an upper substrate unit 12 opposing the lower substrate unit 11. The upper substrate unit 12 includes a protrusion 121 having two sections 122 perpendicular to each other. Liquid crystal molecules "A" adjacent to the two sections 122 can be respectively aligned in two different directions. Therefore, the liquid crystal molecules "A" can be provided with four pre-tilt angles by the protrusion 121 in order to define the four-domain pixel region 10.

However, an inherent color washout exists in the four-domain wide-viewing angle LCD devices. To overcome this problem, an eight-domain technique has been proposed. In the eight-domain LCD device, a pixel region includes two protrusions in which different potential differences are applied, such that the liquid crystal molecules that are adjacent to the two protrusions can be respectively aligned in different directions, thus defining an eight-domain pixel region. The color washout is less apparent because the liquid crystal molecules can be aligned in more directions. Two major approaches are proposed to form eight-domain pixel regions, employing capacitance coupling (CC) technique and employing two field-effect transistors (TT) technique to generate potential differences in an eight-domain pixel region. However, residual images will be produced by using the capacitance coupling technique, and a high scanning frequency will be produced from using the two field-effect transistors technique.

Therefore, there is room for improvement within the art.

SUMMARY

According to an aspect of the present disclosure, a multi-domain vertical alignment (MVA) LCD device is provided. The vertical alignment liquid crystal display device includes a number of pixel regions. Each pixel region includes a lower substrate unit and an upper substrate unit. The upper substrate unit includes an upper glass layer with a first protrusion and a second protrusion formed thereon, as well as a conductive layer formed on the second protrusion. Each of the first and second protrusions includes two uneven sections. A first potential difference is applied between the upper glass layer and the lower substrate unit, and a second potential difference is applied between the conductive layer formed on the second protrusion and the lower substrate unit, wherein the second potential difference is independent from the first potential difference.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
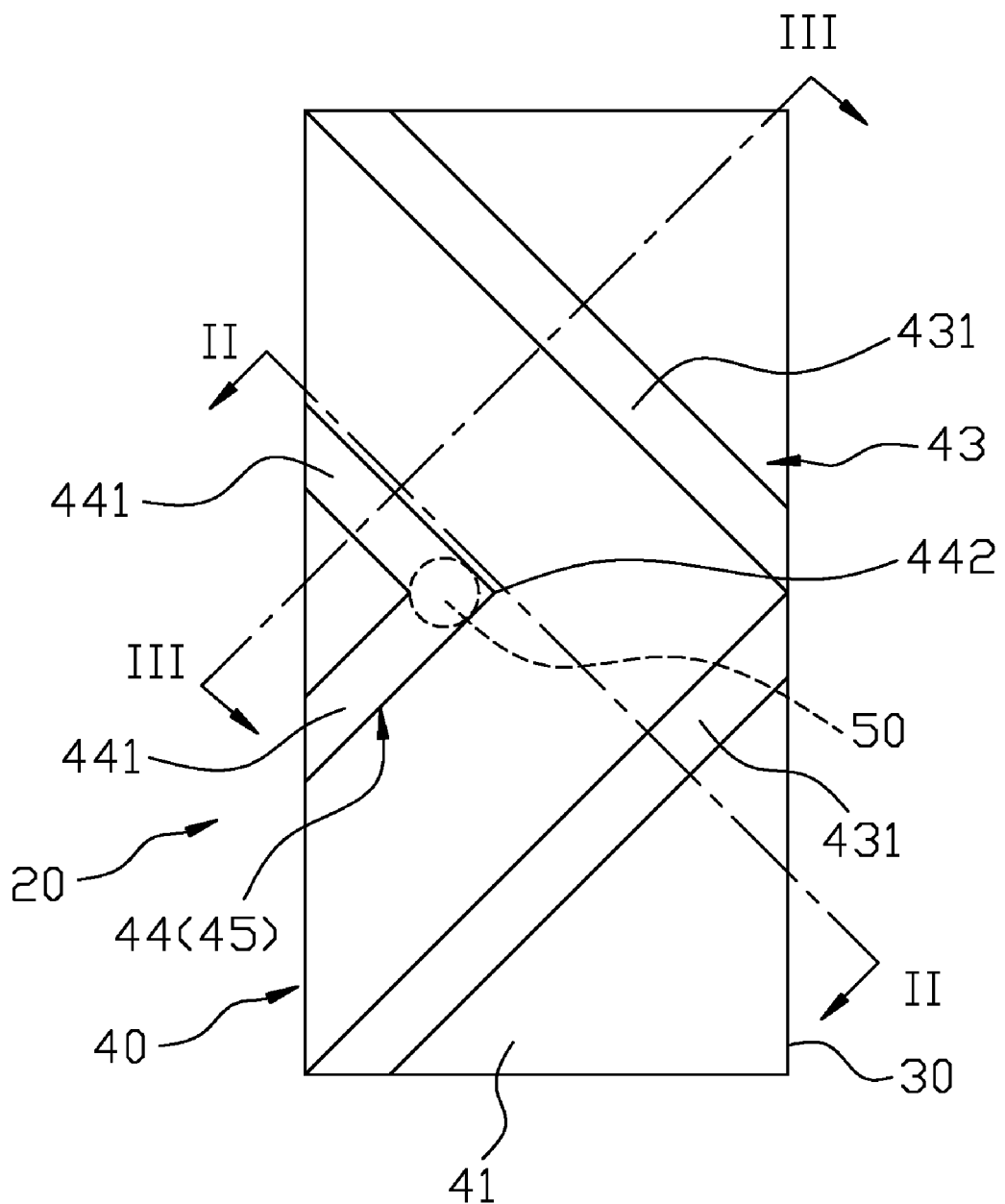
FIG. 1 is a front view of a pixel region of a first embodiment of a vertical alignment liquid crystal display device.
Figure 2:
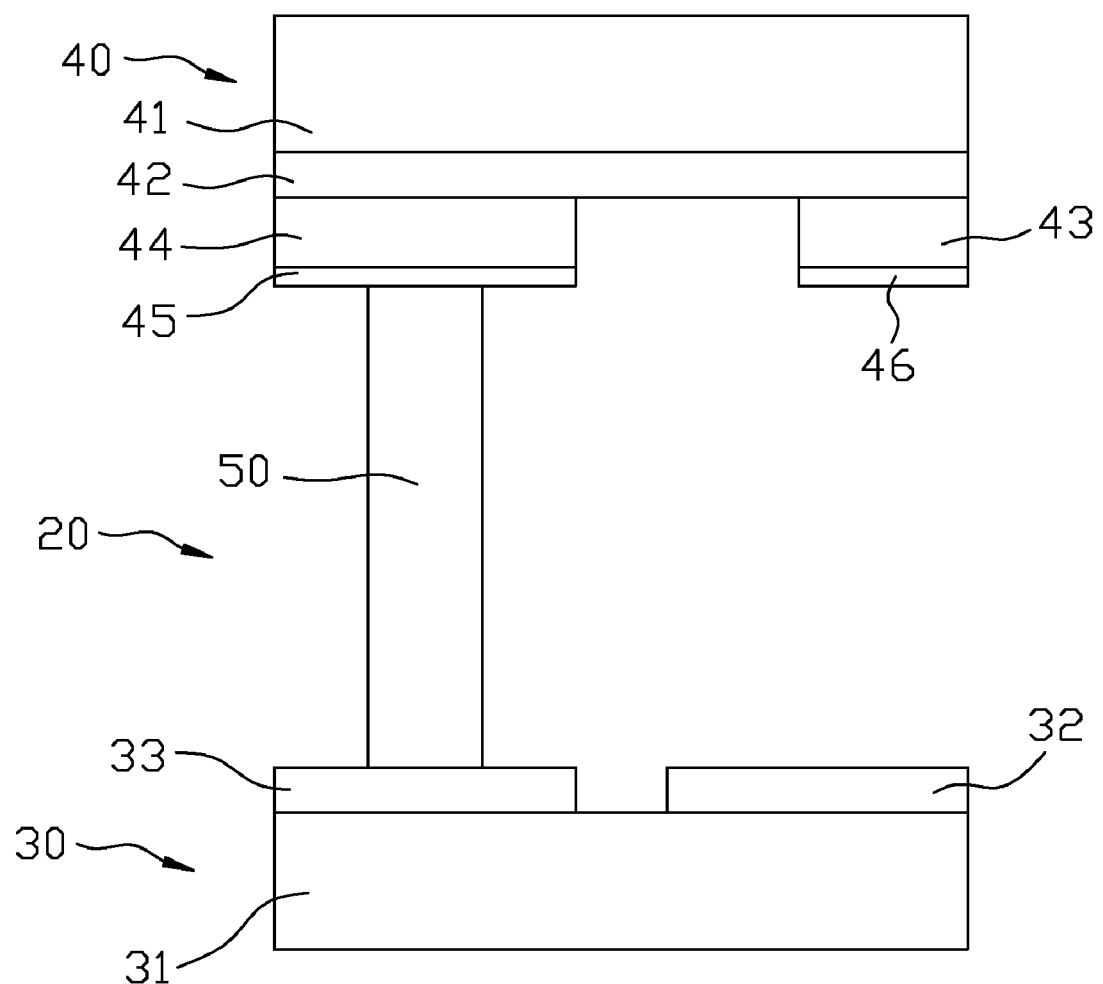
FIG. 2 is a cross-section of the pixel region, with a conductive layer of a second protrusion electrically connected to a second electrode region by a conductive member, taken along the line II-II shown in FIG. 1.
Figure 3:
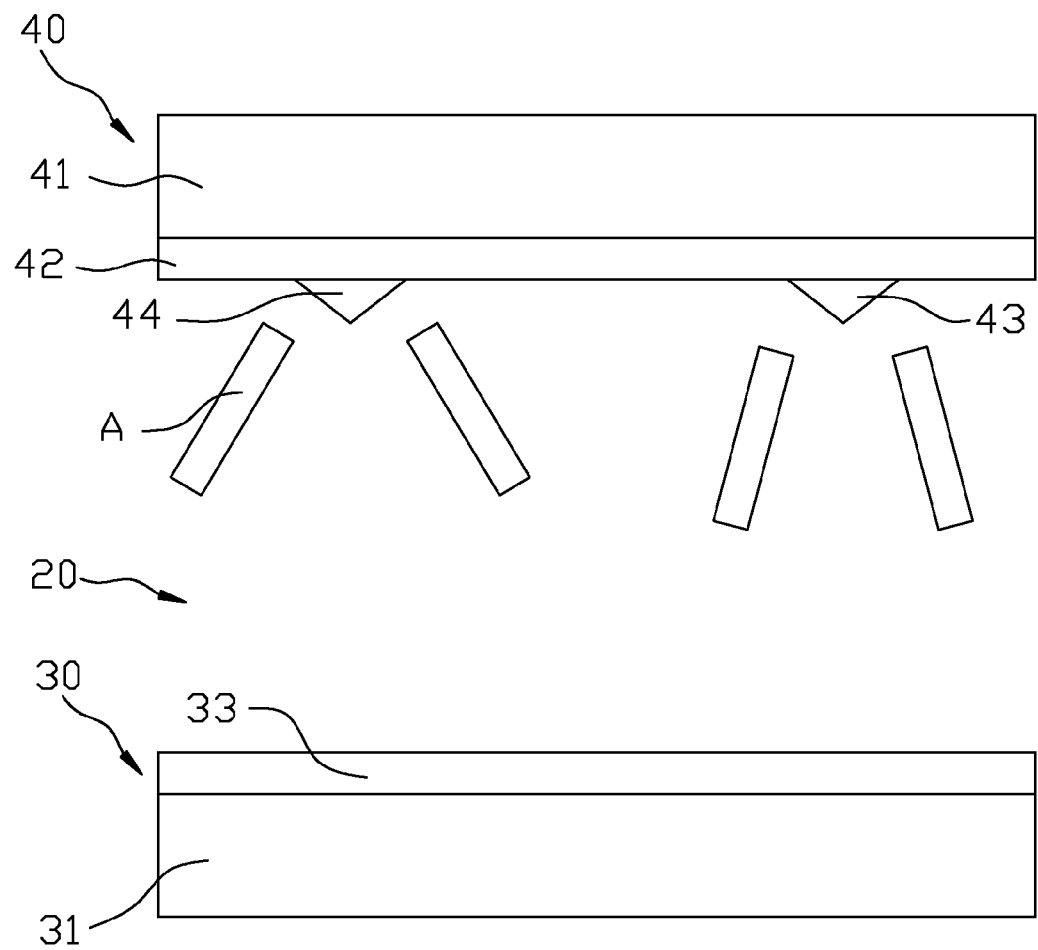
FIG. 3 is a cross-section of the pixel region, with liquid crystal molecules adjacent to a first protrusion and a second protrusion aligned towards different directions, taken along the line III-III shown in FIG. 1.

Referring to FIG. 1 to FIG. 3, a vertical alignment liquid crystal display device according to a first embodiment includes a number of pixel regions 20. Each pixel region 20 includes, but is not limited to, a lower substrate unit 30, an upper substrate unit 40, and a conductive member 50. The vertical alignment liquid crystal display device may be a wide-viewing angle type with multi-domain vertical alignment (MVA). Other structural elements of the vertical alignment liquid crystal display device, such as thin film transistors (TFT) are not illustrated here.

The lower substrate unit 30 includes a lower glass layer 31, a first electrode region 32, and a second electrode region 33. The first and second electrode regions 32, 33 are formed on a top surface of the lower glass layer 31.

The upper substrate unit 40 includes an upper glass layer 41, a transparent conductive film 42, a first and a second protrusions 43 and 44 which are formed on the film 42, and a conductive layer 45 formed on the second protrusion 44. Furthermore, in order to simplify the manufacturing process, a conductive layer 46 can be formed on the first protrusion 43 when forming the conductive layer 45 on the second protrusion 44. That is to say, the conductive layer 46 may be optional. However, if the conductive layer 46 is omitted, the manufacturing process may become more complicated.

The first and second protrusions 43 and 44 are made of insulated material, such that the conductive layer 45 is electrically insulated against the transparent conductive film 42. In this embodiment, the transparent conductive film 42 may be made of indium-tin oxide (ITO), and the first and second protrusions 43 and 44 may be made of organic materials, such as acetic acid-1-methoxy-2-propyl ester, 3-methoxy-propionic acid methyl ester, or 2-methoxy-1-propanol acetate. The material of the conductive layer 45 is similar to the second protrusion 44, but mixed with conductive materials, such as gold, silver, copper, aluminum and conductive polymers.

Further note that the first protrusion 43 includes two uneven first sections 431. The second protrusion 44 includes two uneven second sections 441 and a turning point 442 connecting the adjacent ends of the two second sections 441. The first and second protrusions 43 and 44 are substantially parallel to each other. In the illustrated embodiment, the two first sections 431 are substantially perpendicular to each other, and the two second sections 441 are substantially perpendicular to each other as well.

The conductive member 50 is disposed between the conductive layer 45 formed on the second protrusion 44 and the second electrode region 33 to electrically connect the conductive layer 45 and the second electrode region 33. In the illustrated embodiments, the conductive member 50 is provided with a number of photo spacers for separating and electrically connecting the lower and upper substrate units 30 and 40. The conductive member 50 may be made of acrylic or rubber, mixed with conductive materials, and is precisely located at the turning point 442 of the second protrusion 44. The second electrode region 33 may be a ground electrode.

In the first exemplary embodiment, a first potential difference is generated between the transparent conductive film 42 and the first electrode region 32, when a voltage is applied to the transparent conductive film 42 and the first electrode region 32 of the lower substrate unit 30. Since the first protrusion 43 is electrically insulated and formed on the transparent conductive film 42, the first potential difference is also applied between the first protrusion 43 and the first electrode region 32. Additionally, a second potential difference independent from the first potential difference is generated between the conductive layer 45 and the first electrode region 32, when the conductive member 50 applies a predetermined voltage to the second electrode region 33 and the conductive layer 45 of the second protrusion 44. The second potential difference is adjustable and independent from the first potential difference, such that the electric fields are correspondingly different. Therefore, the liquid crystal molecules "A" adjacent to the first and second protrusions 43 and 44 are aligned in different directions forced by the electric fields to provide the liquid crystal molecules "A" with different pre-tilt angles to define an eight-domain pixel region. In addition, the ground electrode of the original circuit can function as the second electrode region 33, thus additional wiring and increased cost can be avoided. Furthermore, since the additional wires are not required, the original aperture ratio will not be unduly sacrificed.

Besides electrically connecting the conductive layer 45 of the second protrusion 44 to the second electrode region 33 via the conductive member 50, the conductive layer 45 of the second protrusion 44 can be further electrically connected to the conductive layer 45 on the second protrusion 44 of another pixel region 20. In such a manner, a number of pixel regions 20 are electrically connected by connecting the conductive layers 45 to each other (not shown), and thus only one common conductive member 50 is required in order to share the same conductive member 50.

Figure 4:
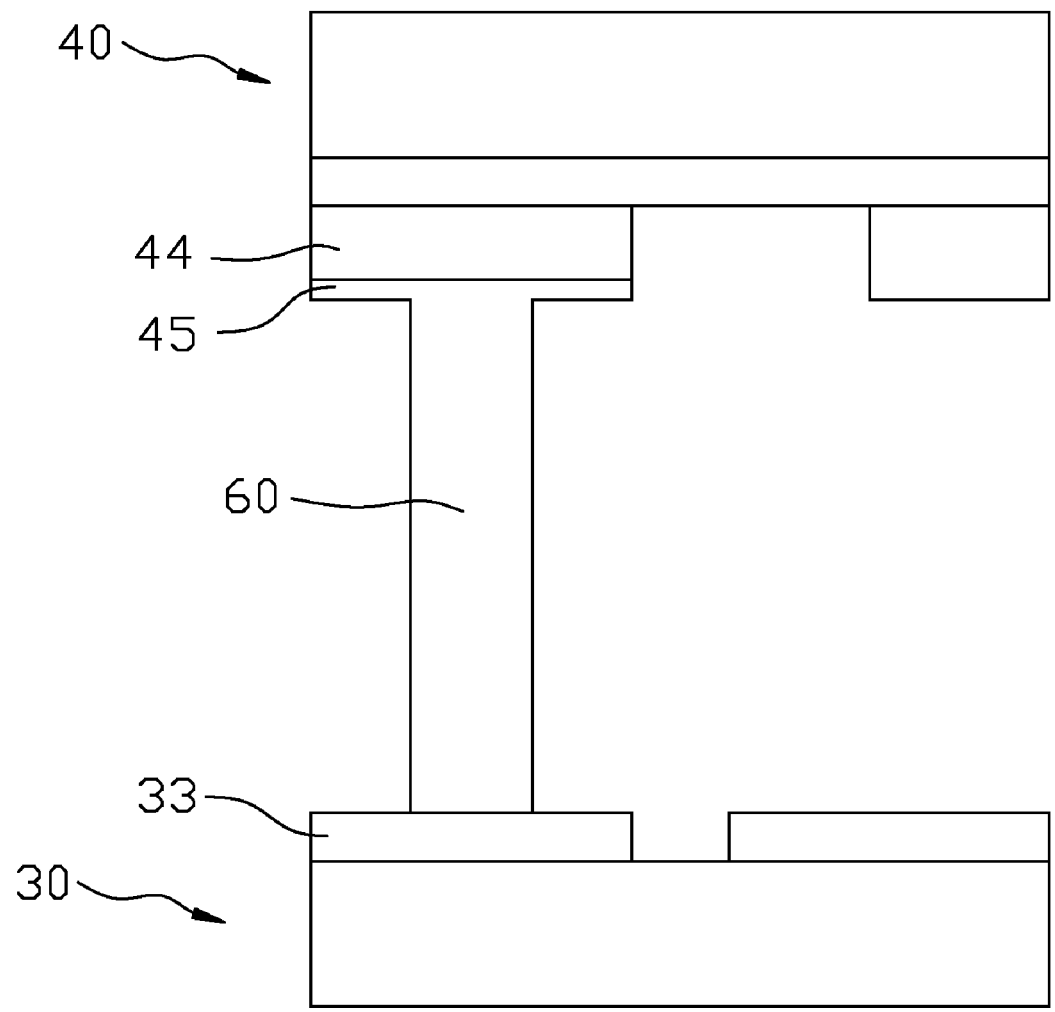
FIG. 4 is a cross-section of a pixel region of a second embodiment of a vertical alignment liquid crystal display device.

Referring to FIG. 4, a vertical alignment liquid crystal display device according to a second embodiment is similar to the first embodiment. However, the second embodiment includes a conductive pillar 60 integrally formed with the conductive layer 45 of the second protrusion 44. The conductive pillar 60 is electrically connected to the second electrode region 33.

In the first embodiment, the conductive member 50 is accurately located on the turning point 442 of the second protrusion 44, as is shown in FIG. 1 and FIG. 2. However, in the second embodiment, the conductive pillar 60 is integrally formed with the conductive layer 45 by a deposition process.

Figure 5:
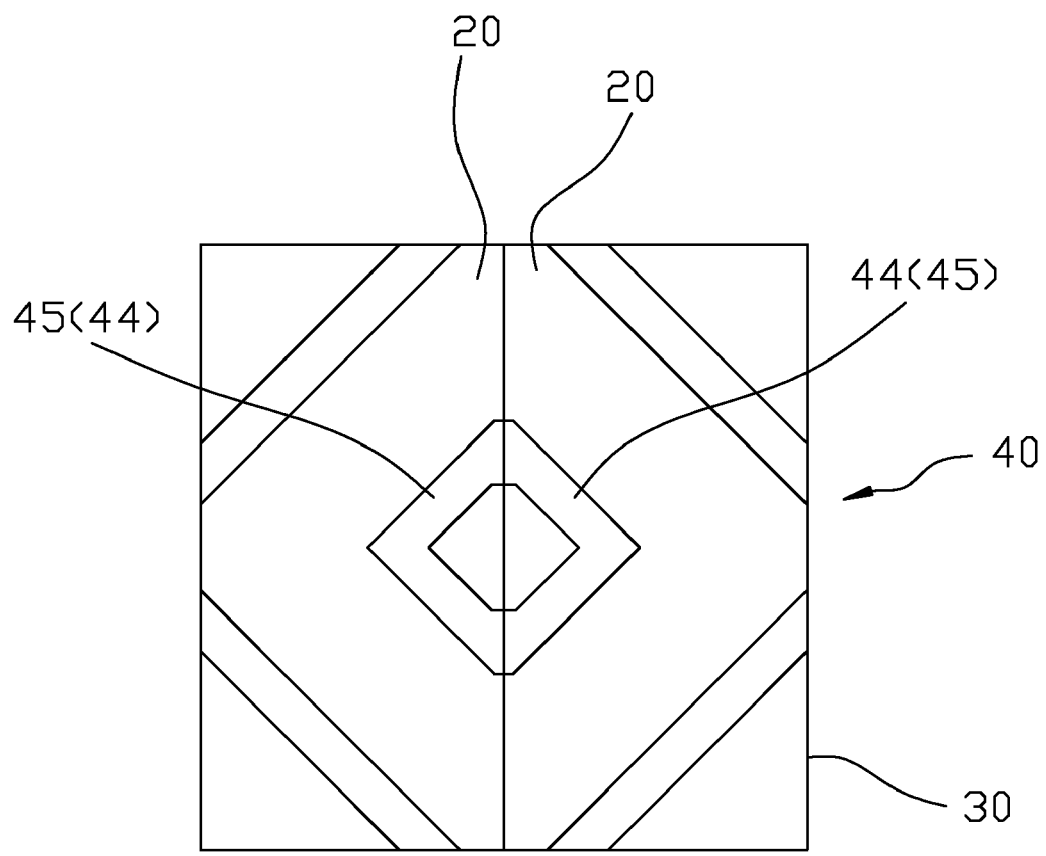
FIG. 5 is a front view of a pixel region of a third embodiment of a vertical alignment liquid crystal display device.
Figure 6:
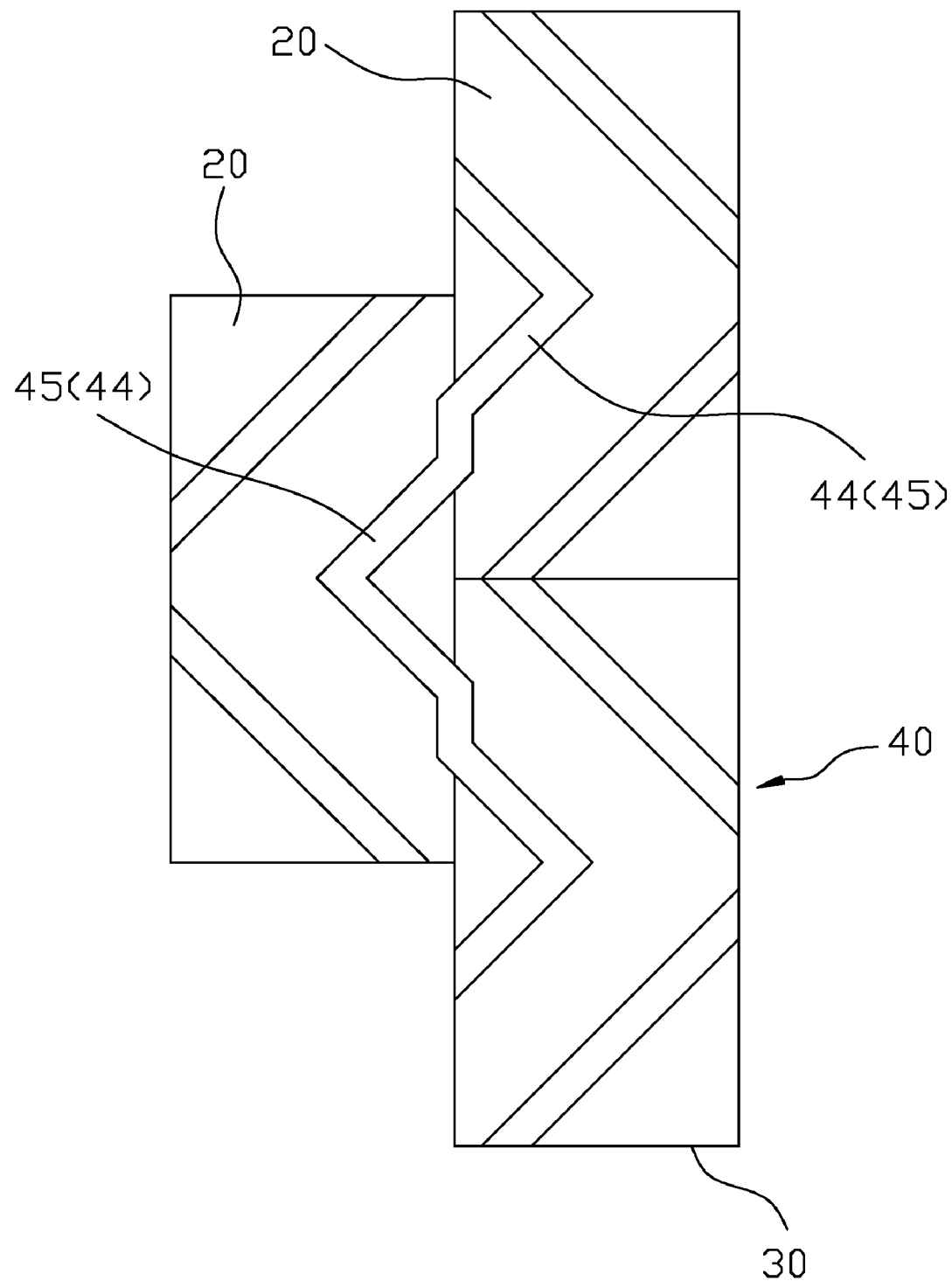
FIG. 6 is a front view of the third embodiment with an alternative connection means.
Figure 7:
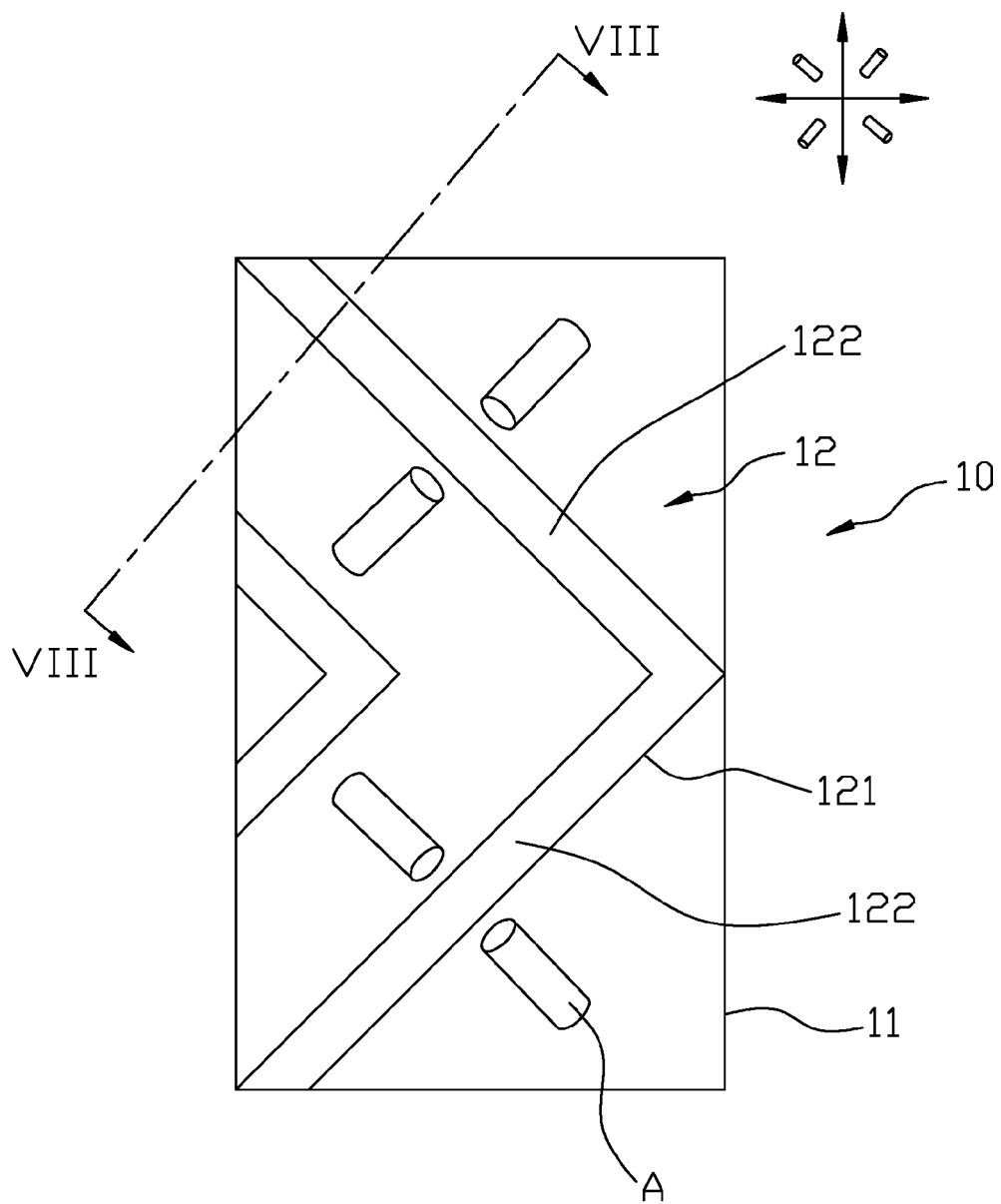
FIG. 7 is a front view of a four-domain pixel region employed by a conventional liquid crystal display.
Figure 8:
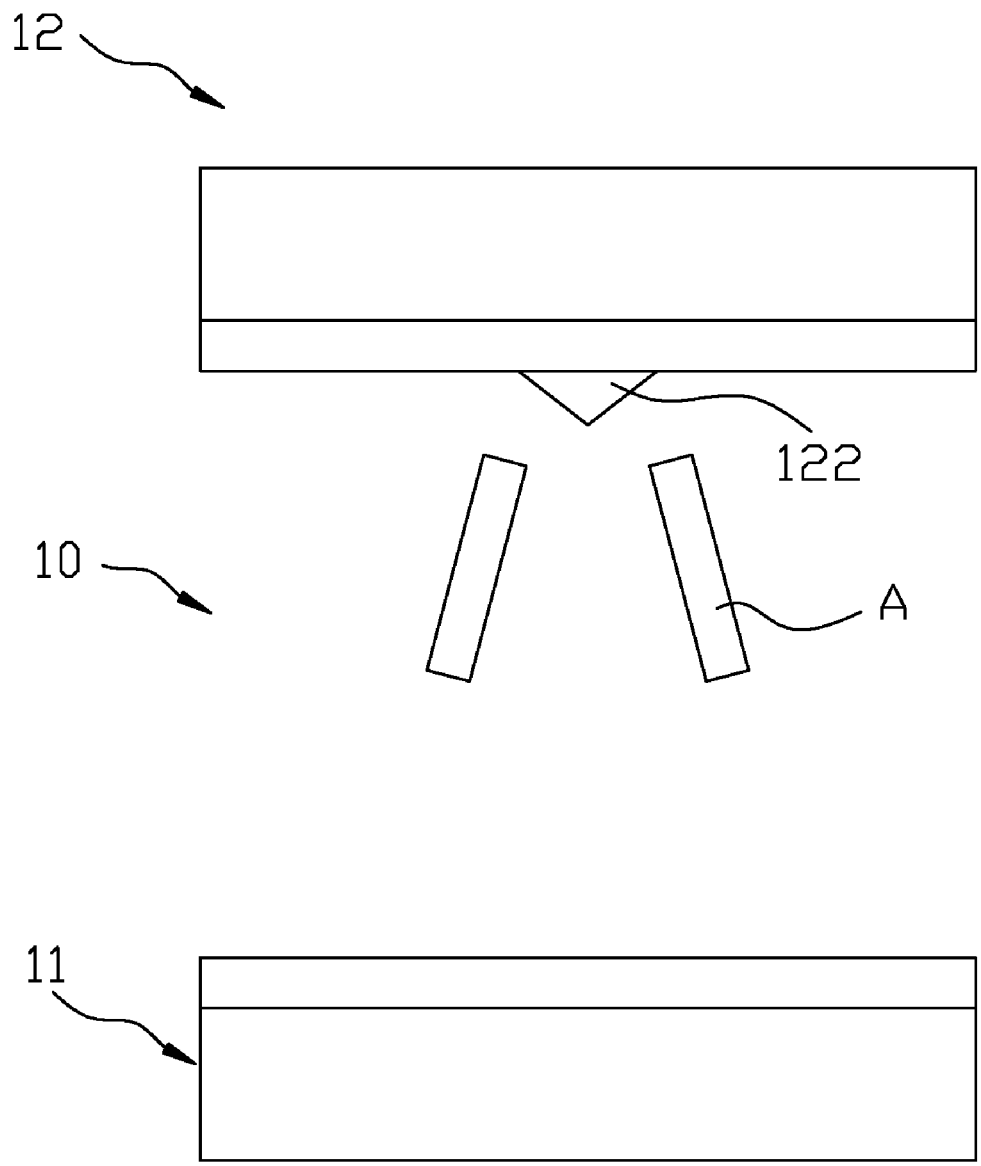
FIG. 8 is a cross-section of the pixel region, with liquid crystal molecules aligned towards different directions, taken along the line VIII-VIII shown in FIG. 7.

Referring to FIGS. 5 and 6, a vertical alignment liquid crystal display device according to a third embodiment is similar to the first embodiment. However, the conductive layer 45 formed on the second protrusion 44 of the pixel region 20 is electrically connected to a conductive layer 45 formed on a second protrusion 44 of other pixel regions 20. As illustrated in FIG. 5, the conductive layer 45 of one pixel region 20 is electrically connected to the conductive layer 45 formed on the second protrusion 44 of the other one pixel region 20, thus only one conductive member 50 is required for these two pixel regions 20. As illustrated in FIG. 6, one pixel region 20 is connected to the other two pixel regions 20 by electrically connecting the conductive layers 45 of the three pixel regions 20 to each other. In such a manner, a number of pixel regions 20 can be electrically connected by electrically connecting the conductive layers 45 to each other so as to form a network. The conductive layer 45 located on the edge portion of the vertical alignment liquid crystal display device is electrically connected to the ground electrode of the lower substrate unit 30, such that a predetermined voltage can be applied to the conductive layer 45 directly by the ground electrode, and the conductive member 50 can be omitted.

With the embodiments discussed here, the second potential difference can be applied to the conductive layer 45 formed on the second protrusion 44 through the second electrode region 33 and the conductive member 50 or the conductive pillar 60. In other embodiments, the conductive layers 45 of a number of pixel regions 20 can be electrically connected to each other. The conductive layer 45, located on the edge portion of the vertical alignment liquid crystal display device, is electrically connected to the ground electrode of the lower substrate unit 30, such that the second potential difference can be applied to the conductive layer 45 when applying a predetermined voltage to the ground electrode. Since the first potential difference can be adjustable and to be independent or different from the second potential difference, the liquid crystal molecules "A" adjacent to the first and second protrusions 43 and 44 can be pre-tilted in different directions, thus providing the pixel region 20 with different pre-tilt angles, and defining an eight-domain pixel region. Compared to the pixel regions using two field-effect transistors, the vertical alignment liquid crystal display devices have the identical gate lines, driving time, scanning frequency, and lower cost. Compared to the pixel regions employing series connected capacitors, the vertical alignment liquid crystal display devices can avoid residual images and improve upon an imaging quality.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A vertical alignment liquid crystal display device comprising a plurality of pixel regions, each pixel region comprising:
    a lower substrate unit; and
    an upper substrate unit, comprising:
        an upper glass layer;
        a first protrusion formed on the upper glass layer, and a second protrusion formed on the upper glass layer; and
        a conductive layer, formed on the second protrusion; wherein the first protrusion comprises two uneven first sections, the second protrusion comprises two uneven second sections, a first potential difference is applied between the upper glass layer and the lower substrate unit, a second potential difference is applied between the conductive layer formed on the second protrusion and the lower substrate unit, and the second potential difference is independent from the first potential difference.

2. The vertical alignment liquid crystal display device of claim 1, wherein the lower substrate unit comprises a lower glass layer with a top surface, a first electrode region and a second electrode region are formed on the top surface, and the first potential difference is applied between the first protrusion and the first electrode region.

3. The vertical alignment liquid crystal display device of claim 2, wherein each pixel region further comprises a conductive member positioned between the second electrode region and the conductive layer formed on the second protrusion.

4. The vertical alignment liquid crystal display device of claim 3, wherein the second electrode region is a ground electrode.

5. The vertical alignment liquid crystal display device of claim 3, wherein the conductive member is provided with a plurality of photo spacers for separating and electrically connecting the lower and upper substrate units.

6. The vertical alignment liquid crystal display device of claim 5, wherein the second protrusion further comprises a turning point connecting the two uneven second sections thereof, and the conductive member is positioned at the turning point.

7. The vertical alignment liquid crystal display device of claim 2, wherein each pixel region further comprises a conductive pillar integrally formed with the conductive layer on the second protrusion and electrically connected to the second electrode region.

8. The vertical alignment liquid crystal display device of claim 7, wherein the second electrode region is a ground electrode.

9. The vertical alignment liquid crystal display device of claim 2, wherein the conductive layer formed on the second protrusion is electrically connected to the second electrode region on the lower substrate unit and at least one conductive layer formed on a second protrusion of another pixel region of the plurality of pixel regions.

10. The vertical alignment liquid crystal display device of claim 1, wherein the first protrusion is parallel to the second protrusion.

11. The vertical alignment liquid crystal display device of claim 10, wherein the two first sections on the first protrusion are perpendicular to each other, and the two second sections on the second protrusion are perpendicular to each other.

12. The vertical alignment liquid crystal display device of claim 1, wherein the conductive layer on the second protrusion is electrically connected to at least one conductive layer on a second protrusion of another pixel region of the plurality of pixel regions.

13. The vertical alignment liquid crystal display device of claim 12, wherein the conductive layer on the second protrusion positioned on an edge portion of the liquid crystal display is electrically connected to the second electrode region of the lower substrate unit.

14. A vertical alignment liquid crystal display device comprising a plurality of pixel regions, each pixel region comprising:
a lower substrate unit;
an upper substrate unit, comprising:
an upper glass layer;
a first protrusion formed on the upper glass layer, and a second protrusion formed on the upper glass layer; and
a conductive layer, formed on the second protrusion;
wherein the first protrusion comprises two uneven first sections, the second protrusion comprises two uneven second sections, a first potential difference is applied between the upper glass layer and the lower substrate unit, an adjustable second potential difference is applied between the conducive layer on the second protrusion and the lower substrate unit, the second potential difference is independent from the first potential difference, and a plurality of liquid crystal molecules of the pixel regions adjacent to the first and second protrusions are capable of being aligned in a plurality of directions according to the first and second potential differences to define an eight-domain pixel region.

15. The vertical alignment liquid crystal display device of claim 14, wherein the lower substrate unit further comprises a lower glass layer with a top surface, a first electrode region and a second electrode region are formed on the top surface, and the first potential difference is applied between the first protrusion and the first electrode region.

16. The vertical alignment liquid crystal display device of claim 15, wherein each pixel region further comprises a conductive member positioned between the second electrode region and the conductive layer on the second protrusion.

17. The vertical alignment liquid crystal display device of claim 15, wherein each pixel region further comprises a conductive pillar integrally formed with the conductive layer on the second protrusion and electrically connected to the second electrode region.

18. The vertical alignment liquid crystal display device of claim 15, wherein the conductive layer on the second protrusion is electrically connected to the second electrode region on the lower substrate unit and at least one conductive layer formed on a second protrusion of another pixel region of the plurality of pixel regions.

19. The vertical alignment liquid crystal display device of claim 15, wherein the conductive layer on the second protrusion is electrically connected to at least one conductive layer formed on a second protrusion of another pixel region of the plurality of pixel regions.

20. The vertical alignment liquid crystal display device of claim 19, wherein the conductive layer on the second protrusion located on an edge portion of the liquid crystal display is electrically connected to the second electrode region of the lower substrate unit.

* * * * *